United States Patent
Wong et al.

(10) Patent No.: US 7,480,522 B2
(45) Date of Patent: Jan. 20, 2009

(54) ROCKER USER INTERFACE FOR HANDHELD DEVICES, AND METHOD FOR IMPLEMENTING SAME

(75) Inventors: John Patrick Wong, Vancouver (CA); Jeff Philip Crampton, Vancouver (CA)

(73) Assignee: Nokia Corporation, Espoo (FI)

( * ) Notice: Subject to any disclaimer, the term of this patent is extended or adjusted under 35 U.S.C. 154(b) by 1153 days.

(21) Appl. No.: 10/335,254

(22) Filed: Dec. 31, 2002

(65) Prior Publication Data

US 2004/0203524 A1 Oct. 14, 2004

(51) Int. Cl.
*H04B 1/38* (2006.01)
(52) U.S. Cl. ............... 455/575.1; 455/575.8; 455/575.6; 455/90.3
(58) Field of Classification Search ................ 455/90.3, 455/575.1, 575.5, 575.6, 575.8, 24, 100, 455/91, 556.2, 556.1, 557; 361/680, 681, 361/682, 683, 679; 200/6 R, 6 A, 4, 5 A, 200/513, 5 R, 1 R, 17 R, 339, 341, 557, 345
See application file for complete search history.

(56) References Cited

U.S. PATENT DOCUMENTS

| | | | | |
|---|---|---|---|---|
| 5,378,862 | A * | 1/1995 | Tasaka et al. ............... | 200/6 A |
| 5,889,242 | A * | 3/1999 | Ishihara et al. ............. | 200/6 A |
| 5,967,297 | A * | 10/1999 | Kaufman et al. ............ | 200/241 |
| 6,163,688 | A * | 12/2000 | Fujii et al. .................. | 455/318 |
| 6,246,863 | B1 * | 6/2001 | Kampel ....................... | 455/100 |
| 6,298,842 | B1 * | 10/2001 | Sims ............................ | 124/89 |
| 6,329,614 | B1 * | 12/2001 | Miyashita ................... | 200/5 R |
| 6,353,414 | B1 * | 3/2002 | Jones et al. ................. | 343/702 |
| 6,514,143 | B1 * | 2/2003 | Tanaka et al. ................ | 463/37 |
| 6,613,989 | B2 * | 9/2003 | Tsuda et al. .................. | 200/4 |
| 6,628,266 | B1 * | 9/2003 | Aguilar et al. .............. | 345/161 |
| 6,642,919 | B1 * | 11/2003 | Jaeger et al. ................ | 345/161 |
| 6,826,042 | B2 * | 11/2004 | Oross et al. ................. | 345/161 |
| 6,836,403 | B2 * | 12/2004 | Hsu ........................... | 345/160 |
| 2001/0047926 | A1 * | 12/2001 | Kozuma ..................... | 200/6 A |
| 2004/0018863 | A1 * | 1/2004 | Engstrom et al. ........ | 455/575.8 |

OTHER PUBLICATIONS

HowStuffWorks "How Joysticks Work", available at http://electronics.howstuffworks.com/joystick.htm/printable, dated Jul. 25, 2008, 12 pages.

HowStuffWorks "How Dreamcast Works", available at http://electronics.howstuffworks.com/dreamcast.htm/printable, dated Jul. 25, 2008, 12 pages.

HowStuffWorks "How N64 Works", available at http://electronics.howstuffworks.com/n64.htm/printable, dated Jul. 25, 2008, 12 pages.

(Continued)

*Primary Examiner*—John J Lee
(74) *Attorney, Agent, or Firm*—Alston & Bird LLP

(57) ABSTRACT

A rocker includes a stem fabricated from an elastomeric material, having a first end and a second end, the second end being mountable to a base. A cap is secured to the first end of the stem. The elastomeric material of the stem is effective for resiliently urging the cap to an original position subsequent to being moved from the original position to a depressed position. Conductive elements are positioned on the cap for establishing an electrical connection between circuit elements of a printed wire board when the second end of the stem is mounted to the base and the cap is moved to a depressed position.

24 Claims, 2 Drawing Sheets

OTHER PUBLICATIONS

HowStuffWorks "How PlayStation Works", available at http://electronics.howstuffworks.com/playstation.htm/printable, dated Jul. 25, 2008, 13 pages.

HowStuffWorks "How PlayStation 2 Works", available at http://electronics.howstuffworks.com/ps2.htm/printable, dated Jul. 25, 2008, 11 pages.

HowStuffWorks "How the PSP Works", available at http://electronics.howstuffworks.com/psp.htm/printable, dated Jul. 25, 2008, 10 pages.

http://upload.wikimedia.org/wikipedia/commons/9/97/DigQJin1.jpg;, dated Jul. 25, 2008, 1 page.

http://farm1.static.flickr.com/32/98227697_e8452e7eef.jpg?v=0, dated Jul. 25, 2008, 1 page.

* cited by examiner

ROCKER USER INTERFACE FOR HANDHELD DEVICES, AND METHOD FOR IMPLEMENTING SAME

TECHNICAL FIELD

The invention relates generally to user interfaces and, more particularly, to user interfaces configured for facilitating browsing of a graphical user interface screen and/or interacting with electronic games on handheld devices.

BACKGROUND

Users of handheld devices, such as cellular mobile telephones, communicators, multimedia phones, personal digital assistants (PDAs), handheld gaming devices, and the like, and combinations thereof, collectively referred to herein as "handheld devices," desire that such devices provide telecommunication services, as well as gaming, entertainment, and other features that require sophisticated graphical user interfaces (GUI's). A need has therefore arisen to develop and provide sophisticated user interfaces (UI's) that provide enhanced gaming and entertainment capabilities, which are also intuitive to use.

A common gaming UI is a gaming rocker (hereinafter referred to as a "rocker") which may be depressed at any one of a number of points, such as four, five, eight, or nine points, located on the rocker. For example, a rocker with four such points, may be depressed at a selected point to indicate orthogonal directions such as up, down, left, or right.

Conventionally, gaming rockers are designed to rotate about a center pillar made of a rigid material, such as plastic or metal. A skirt fabricated from an elastic material, such as silicon, is positioned about the perimeter of the rocker so that, when the rocker is depressed, the skirt is deformed. Then, when pressure on the rocker is released, the skirt restores the rocker to its original position.

However, unlike keys on a cell phone, which are designed to withstand one to two million cycles, a rocker must be configured to withstand up to five million cycles, and maintain good user feel during the entirety of its life. Conventional rockers using an elastic skirt, however, will not generally withstand such demands.

Thus, a need has arisen for a rocker that can withstand up to five million cycles of usage, while maintaining good user feel during the entirety of its life.

SUMMARY

The present invention, accordingly, provides for a rocker having a stem fabricated from an elastomeric material, having a first end and a second end, the second end being mountable to a base. A cap is secured to the first end of the stem. The elastomeric material of the stem is effective for resiliently urging the cap to an original position subsequent to being moved from the original position to a depressed position. Conductive elements are positioned on the cap for establishing an electrical connection between circuit elements of a printed wire board when the second end of the stem is mounted to the base and the cap is moved to a depressed position.

In a preferred embodiment of the present invention, the stem and cap are materially distinct. In an alternate embodiment of the present invention, the stem and cap are materially integral.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning cell phones, printed wire boards, circuitry for implementing logic required for rockers, and the like have been omitted inasmuch as such details are not considered necessary to obtain a complete understanding of the present invention, and are considered to be within the skills of persons of ordinary skill in the relevant art.

Figure 1:
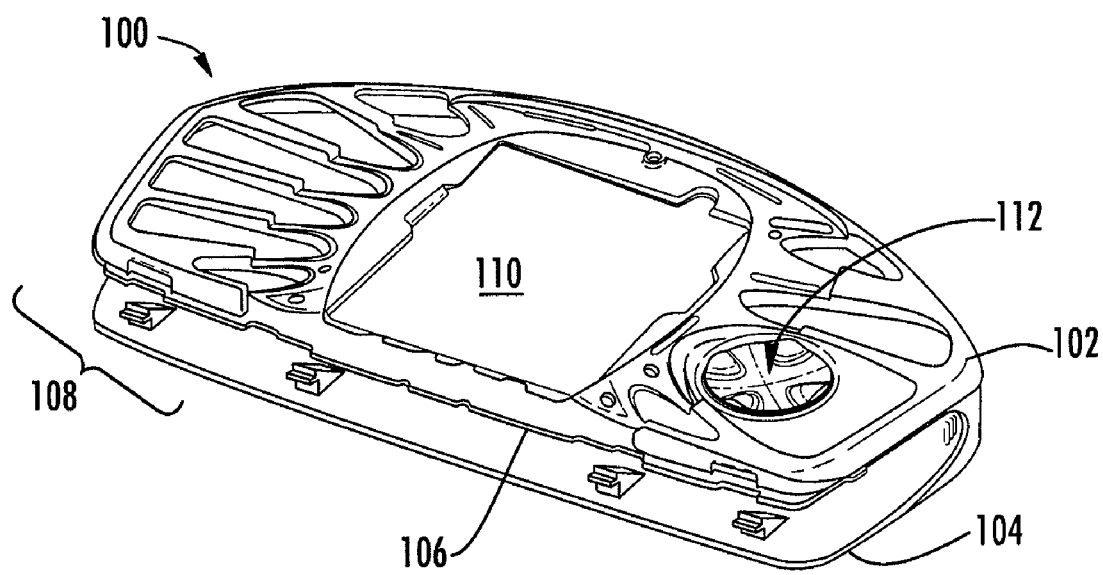
FIG. 1 is a perspective view of a cell phone embodying features of the present invention.
Figure 2:
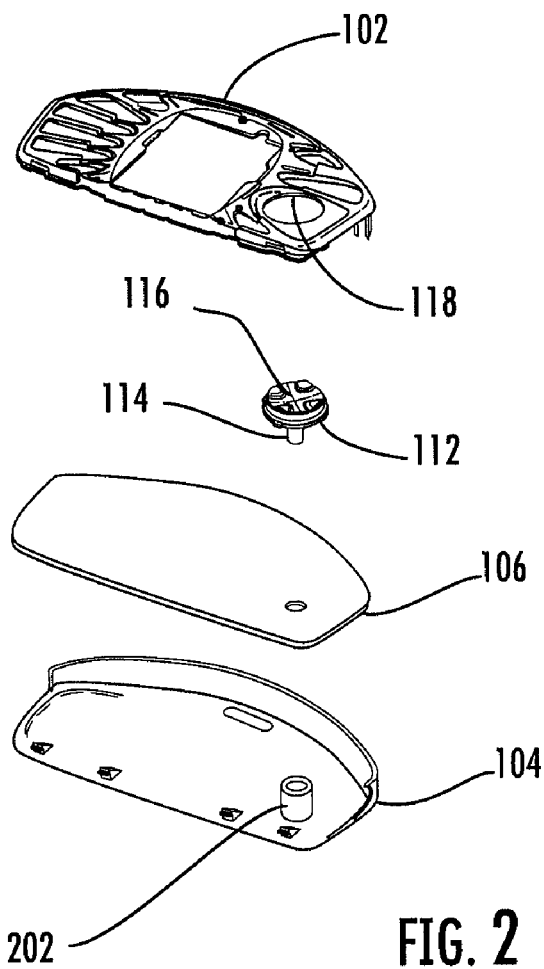
FIG. 2 is an exploded view of the cell phone of FIG. 1.

Referring to FIGS. 1 and 2 of the drawings, the reference numeral 100 generally designates a handheld device, such as a cellular mobile telephone, a communicator, a multimedia phone, a personal digital assistant (PDA), a handheld gaming device, or the like, collectively referred to herein as "handheld device," embodying features of the present invention. The handheld device 100 includes a top cover 102, a bottom cover 104 secured to the top cover 102, and a printed wiring board 106 interposed between the top cover 102 and bottom cover 104. The top cover 102 provides access to a number of conventional handheld device features, such as a key pad 108, a graphical user interface (GUI) or display 110, logic (not shown, for performing functions required, for example, by telecommunication and games), and the like. Such handheld devices and the various aforementioned features are, for the most part, considered to be well-known in the art and will, therefore, not be discussed in further detail herein.

In addition to the foregoing, the handheld device 100 includes a gaming rocker 112, referred to herein as a "rocker," configured for providing an interface between a user and the logic embodied by the handheld device 100. The rocker 112 includes a stem 114 having two ends. A cap 116 attached to one end of the stem 114 using adhesive, heat (effective for melting), screw thread action, a mating configuration, and/or the like. The other end of the stem 114 is mounted in a base mount 202 on the bottom cover 104 of the handheld device 100. The base mount 202 is preferably a socket mount configured for receiving and holding one end of the stem 114 of the rocker 112. Optionally, adhesive, heat (effective for melting), screw thread action, a mating configuration (e.g., a socket configured on the cap for receiving one end of the stem), and/or the like, may be implemented to further secure the rocker 112 in the base mount 202. In an alternate embodiment, adhesive, heat (effective for melting), screw thread action, a mating configuration, and/or the like, may be used to secure the stem 114 to the bottom cover without the base mount 202.

The stem 114 of the rocker 112 is preferably fabricated from a suitable elastomeric material, such as, by way of example and not limitation, silicon, santaprene, rubber, plastic foam, flexible plastic, and the like, effective for resiliently restoring the stem 114 and cap 116 substantially to an original position subsequent to the cap 116 being moved longitudinally along an axis 302 (FIG. 3), and/or radially about an axis 304 (FIG. 3) perpendicular to the axis 302 from the original position to a deformed position (not shown). The stem 114, furthermore, is preferably solid (i.e., has a solid cross-section taken perpendicular to the longitudinal axis of the stem) and, optionally, comprises a cylindrical outer surface. The cap 116 is preferably fabricated from a conventional material, such as hard plastic, and/or the like, that is harder than the elastomeric material used to fabricate the stem 114. Alternatively, the cap 116 may be fabricated integrally with the stem 114 from the same elastomeric material used to fabricate the stem 114.

Figure 3:
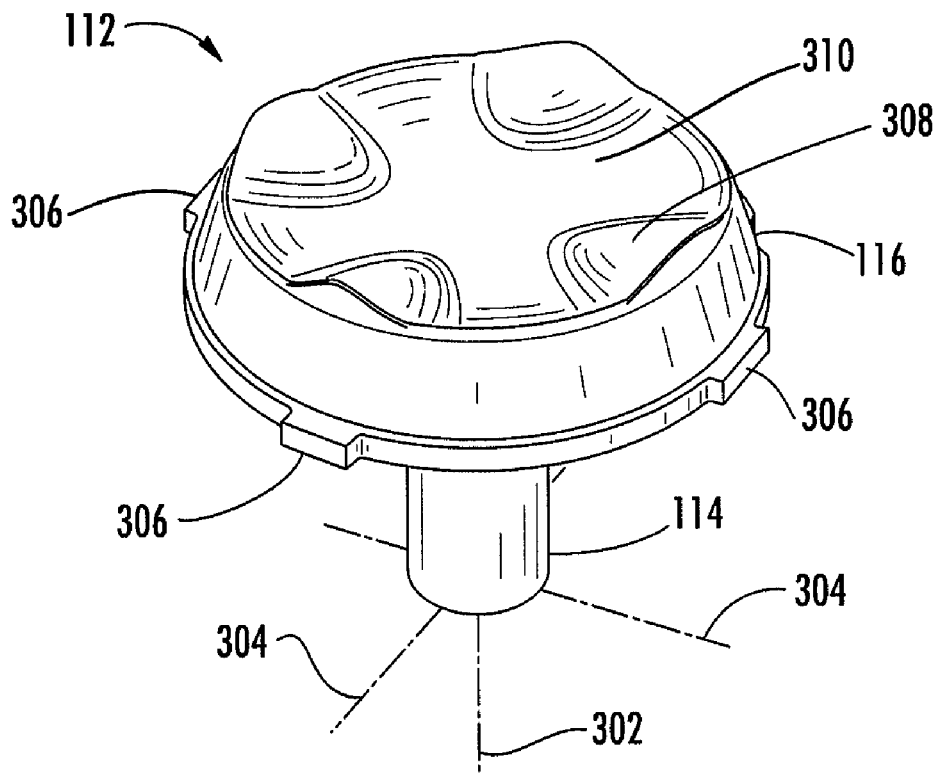
FIG. 3 is an enlarged view a rocker depicted in FIG. 2.
Figure 4:
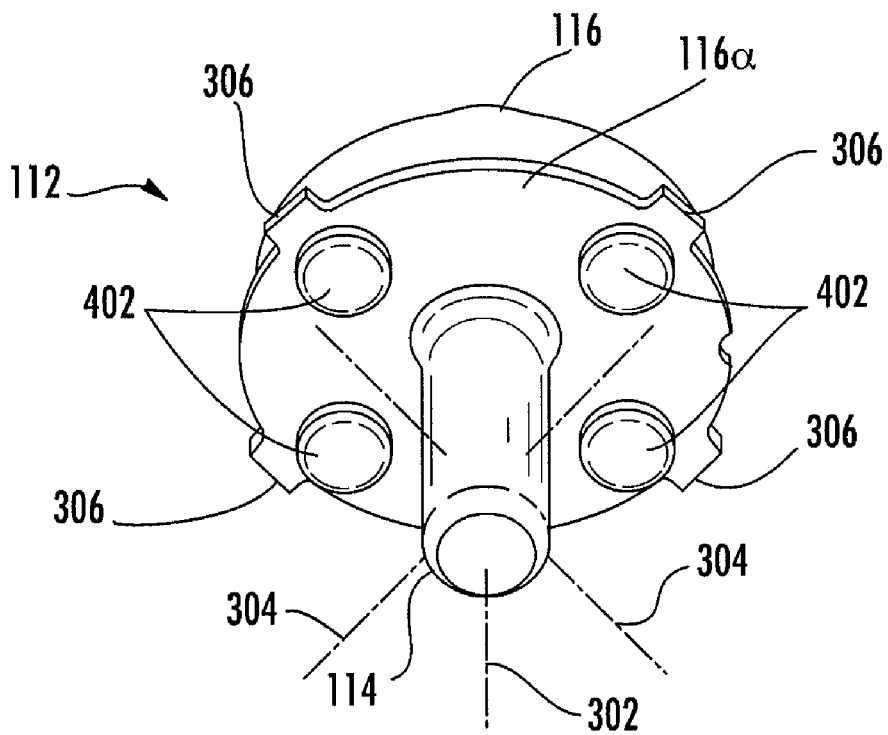
FIG. 4 is an enlarged view of the underside of the cap of the rocker depicted in FIG. 3.

FIGS. 3 and 4 show perspective views of the rocker 112. The cap 116 includes a plurality of lips 306, four of which are exemplified in FIG. 4. The lips 306 are configured for retaining the cap 116 within the opening 118 of the top cover 102, but for also allowing the cap 116 to be depressed within the opening 118. A plurality of conductive elements 402 (also known as pills), four of which are exemplified in FIG. 3, are positioned on the underside 116a of the cap 116 for establishing an electrical connection between two conventional circuit elements (not shown) of the printed wire board 106 when the cap 116 is depressed, as described in further detail below. The conductive elements 42 are fabricated from an electrically conductive material, such as, by way of example, carbon, silicon, copper, aluminum, and the like, and are secured in position using any conventional technique, such as the application of adhesive, heat, and/or the like.

In operation, prior to the application of pressure to the rocker 112, the position of the rocker 112 is referred to herein as an "original" position. A user (not shown) may apply pressure (e.g., finger pressure) at a selected off-center point, such as a point 308 of the cap 116, such points preferably being proximate to an edge of the cap 116 and corresponding to a respective conductive element 402, to effect slight rotation (i.e., angular deformation) of the stem 114 and cap 116 about an axis 304. Pressure is thus applied to the rocker 112 until one of the conductive elements 402 establishes an electrical connection between two conventional circuit elements of the printed wire board 106. When such an electrical connection is established, then the connected circuit elements activate conventional logic associated with the type of pressure applied. For example, if the point 308 of the cap 116 is associated with the "cursor right" function, then when pressure is applied to the point 308, the conductive element 402 most directly "under" (as viewed in FIG. 4) the point 308 contacts and establishes between circuit elements of the printed wire board 106 an electrical connection which activates logic, thereby causing a cursor on the display 110 to move to the right. Upon the release of pressure applied to a point 308 of the cap 116, the resiliency of the elastomeric material constituting the stem 114 restores the rocker 112 to the original position it had prior to the application of pressure.

Alternatively, a user may apply pressure substantially to the center point 310 of the cap 116, thereby causing the stem 114 and cap 116 to move linearly downwardly (as viewed in FIG. 3) (i.e., compress) along the axis 302. Pressure is thus applied to the rocker 112 until two or more of the conductive elements 402 establishes electrical connections between two or more pairs of conventional circuit elements of the printed wire board 106. When multiple such electrical connections are established, then the connected circuit elements activate conventional logic associated with pressure centrally applied to the cap 112. For example, if the point 310 of the cap 116 is associated with the "Enter" function, then when pressure is applied to the point 310, two or more conductive elements 402 contact and establish between multiple pairs of circuit elements of the printed wire board 106 electrical connections which activate logic responsive to an "Enter" command. Upon the release of pressure applied to a point 310 of the cap 116, the resiliency of the elastomeric material constituting the stem 114 restores the rocker 112 to the original position it had prior to the application of pressure.

By the use of the present invention, the elastomeric stem 114 renders unnecessary a resilient skirt called for in the prior art, which skirt is positioned under a rocker to restore the rocker to its original position after pressure is applied to and removed from the cap 116. The life of the rocker, and of the stem 112 in particular, in terms of the number of cycles of pressure application it may withstand, is thereby greatly increased.

It is understood that the present invention may take many forms and embodiments. Accordingly, several variations may be made in the foregoing without departing from the spirit or the scope of the invention. For example, the rocker 112 may be used in combination with devices other than handheld devices. It is understood, too, that the configuration and operation of the conducting elements 306 and circuit elements of which the conducting elements come in contact, and that the method of executing logic when one or more conducting elements establish electrical contact between one or more pairs of respective circuit elements, may vary from that described herein in ways well known to those skilled in the art and, therefore, will not be discussed in further detail herein. In a further variation, the stem 114 may comprise a cross-section taken perpendicular to the longitudinal axis of the stem 114 that defines a star having a number of points corresponding to the number of conducting elements 402 the rocker has, which points are positioned between the conducting elements 402, so that pressure applied to the cap 116 will tend to be more efficiently directed to a single discrete conducting element 402. The cross-section of the stem 114, while preferably solid, may also include a portion at one or both ends which is void (e.g., as a socket) to facilitate more secured attachment of the stem to the cap 116 and/or the base mount 202.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus comprising:
   a stem fabricated from an elastomeric material and having a first end and a second end, said second end being mountable to a base, wherein said base is a portion of one of a wireless device and a gaming device;

a cap secured to said first end of said stem, wherein said elastomeric material of said stem is effective for resiliently urging said cap substantially to a first position subsequent to being moved from said first position to a second position; and conductive elements positioned on said cap for establishing an electrical connection between circuit elements of a printed wire board when said second end of said stem is mounted to said base and said cap is depressed to said second position.

2. The apparatus of claim 1 wherein said elastomeric material comprises at least one of silicon, santaprene, rubber, plastic foam, and flexible plastic.

3. The apparatus of claim 1 wherein said second end of said stem is mountable to said base for facilitating resilient movement of said cap relative to said base.

4. The apparatus of claim 1 wherein said base is a cover portion of a device comprising at least one of a cell phone, mobile phone, communicator, multimedia phone, and gaming device.

5. The apparatus of claim 1 wherein said conductive elements are fabricated from an electrically conductive material comprising at least one of carbon, silicon, copper, and aluminum.

6. The apparatus of claim 1 wherein at least a portion of said stem between said first end and said second end is substantially solid.

7. The apparatus of claim 1 wherein at least a portion of said stem between said first end and said second end is substantially solid and cylindrical in shape.

8. The apparatus of claim 1 wherein the elastomeric material of said stem is effective for resiliently urging said cap substantially to an unbiased position subsequent to being moved to a second position.

9. The apparatus of claim 8 wherein the elastomeric material of said stem is effective for resiliently urging said cap substantially to an unbiased position by resistance to a rocking motion.

10. The apparatus of claim 8 wherein the elastomeric material of said stem is effective for resiliently urging said cap substantially to an unbiased position by resistance to a downward compression.

11. The apparatus of claim 8 wherein the elastomeric material of said stem is effective for resiliently urging said cap substantially to an unbiased position by resistance to an axial rotation.

12. An apparatus comprising:
a body fabricated from an elastomeric material, said body including:
a stem portion having a first end and a second end, said second end being mountable to a base, wherein said base is a portion of one of a wireless device and a gaming device; and
a cap portion extending from said first end of said stem portion, wherein said elastomeric material of said stem is effective for resiliently urging said cap substantially to a first position subsequent to being moved from said first position to a second position; and
conductive elements positioned on said cap portion for establishing an electrical connection between circuit elements of a printed wire board when said second end of said stem is mounted to said base and said cap portion is depressed to said second position.

13. The apparatus of claim 12 wherein said elastomeric material comprises at least one of silicon, santaprene, rubber, plastic foam, and flexible plastic.

14. The apparatus of claim 12 wherein said second end of said stem is mountable to said base for facilitating resilient movement of said cap relative to said base.

15. The apparatus of claim 12 wherein said base is a cover portion of a device comprising at least one of a cell phone, mobile phone, communicator, multimedia phone, and gaming device.

16. The apparatus of claim 12 wherein said conductive elements are fabricated from an electrically conductive material comprising at least one of carbon, silicon, copper, and aluminum.

17. The apparatus of claim 12 wherein at least a portion of said stem portion between said first end and said second end is substantially solid.

18. The apparatus of claim 12 wherein at least a portion of said stem portion between said first end and said second end is substantially solid and cylindrical in shape.

19. An apparatus consisting substantially of:
a stem fabricated from an elastomeric material, said stem having a first end and a second end, said second end being mountable to a base, wherein said base is a portion of one of a wireless device and a gaming device;
a cap secured to said first end of said stem, wherein said elastomeric material of said stem is effective for resiliently urging said cap substantially to a first position subsequent to being moved from said first position to a second position; and
conductive elements positioned on said cap for establishing an electrical connection between circuit elements of a printed wire board when said second end of said stem is mounted to said base and said cap is depressed to said second position.

20. The apparatus of claim 19 wherein said elastomeric material comprises at least one of silicon, santaprene, rubber, plastic foam, and flexible plastic.

21. The apparatus of claim 19 wherein said second end of said stem is mountable to said base for facilitating resilient movement of said cap relative to said base.

22. The apparatus of claim 19 wherein said base is a cover portion of a device comprising at least one of a cell phone, mobile phone, communicator, multimedia phone, and gaming device.

23. The apparatus of claim 19 wherein said conductive elements are fabricated from an electrically conductive material comprising at least one of carbon, silicon, copper, and aluminum.

24. The apparatus of claim 19 wherein at least a portion of said stem between said first end and said second end is substantially solid.

* * * * *